June 1, 1954 A. H. ROSENTHAL 2,680,146

BIREFRINGENT FILTER FOR COLOR TELEVISION

Filed May 31, 1950 2 Sheets-Sheet 1

Inventor:

Adolph H. Rosenthal,

By Cushman, Darby & Cushman

Attorneys.

June 1, 1954 A. H. ROSENTHAL 2,680,146

BIREFRINGENT FILTER FOR COLOR TELEVISION

Filed May 31, 1950 2 Sheets-Sheet 2

Inventor:

Adolph H. Rosenthal,

By Cushman, Darby & Cushman

Attorneys.

Patented June 1, 1954 2,680,146

UNITED STATES PATENT OFFICE 2,680,146

BIREFRINGENT FILTER FOR COLOR TELEVISION

Adolph H. Rosenthal, New York, N. Y., assignor, by mesne assignments, to Skiatron Electronics and Television Corporation, a corporation of New York Continuation of application Serial No. 580,325, March 1, 1945. This application May 31, 1950, Serial No. 165,311

1 Claim. (Cl. 178—5.4)

The present invention relates to the production of images in color.

This case is a continuation of my application, Serial No. 580,325, filed March 1, 1945.

An important object of the invention is to produce images in natural color, for example, in connection with television, by the use of extremely simple and efficient apparatus.

Many systems of color television are based on successive color separation. The partial images are successively formed in black and white and each partial image is viewed or projected through suitable color filters, which successively are red, green and blue.

In some cathode ray tube television systems these filters are mounted on a rotating disk which is arranged in front of the screen of the cathode ray tube and the rotation of the disk is controlled by synchronizing signals assuring that each black and white partial image on the fluorescent screen of the tube will be presented through the proper color filter. In direct-view systems with a cathode ray tube of larger size, a rotary filter disk becomes very bulky and its rapid rotation is noisy and requires considerable power.

The present invention concerns a color filter of large size, the color or spectral characteristic of which can be quickly changed to assume successively the primary colors desired.

Other objects and advantages of the invention will be apparent from the accompanying drawing, wherein Figure 1 is a side elevation of an embodiment of the invention.

Figure 1:
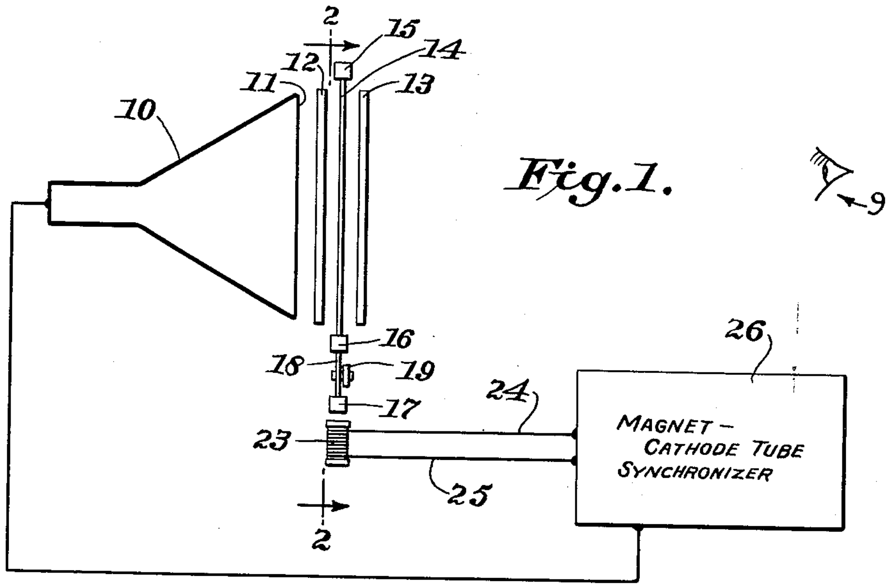

Referring to Figure 1, the numeral 10 designates a cathode ray tube including a fluorescent screen 11. Two sheets of polarizing material indicated by the numerals 12 and 13, respectively, are positioned between the screen 11 and the area at the right of Figure 1 from which the screen is to be viewed, the eye 9 representing a viewing station the directions of polarization of sheets 12 and 13 being crossed. Between the sheets 12 and 13 is supported a birefringent sheet 14 having a suitable thickness as hereinafter described. Suitable media to comprise this sheet are various plastics, including cellulosic sheets such as cellophane. Such materials usually have lengthy molecular structure which can be oriented in preferred directions by tensions during or after manufacture. In other words, the materials are photoelastic.

Figure 2:
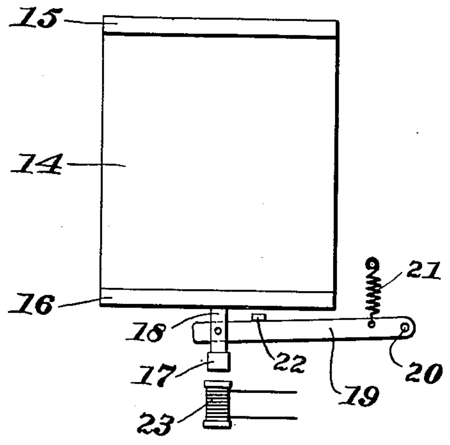
Figure 2 is a sectional view on the line 2—2 of Figure 1.

The sheet 14 of Figure 1 is shown as co-extensive with the area of the face of tube 10 and is supported at its upper edge by a rigidly mounted bar 15 and a second bar 16 is secured to the lower edge of sheet 14. An armature 17 is secured to the bar 16 by a rod 18. As best shown in Figure 2, a lever 19 pivoted at 20 has its free end pivoted to rod 18. The lever 19 is urged upwardly by a spring 21, with upward movement limited by a stop 22. An electromagnet 23 is positioned beneath armature 17 and when magnet 23 is energized, armature 17 and bar 16 will be drawn downwardly to thereby place sheet 14 under tension, the degree of tension being controlled in any suitable way, for example, by the current applied to magnet 23 through the leads 24 and 25. These leads may extend to a means such as 26 for synchronizing the magnet with the color field signals also applied to the tube 10.

With the preferred polarizing directions of birefringent sheet 14 oriented 45° with respect to the directions of polarization of the two polarizing sheets 12 and 13, which are preferably crossed to each other, application of tension to sheet 14 will cause the assembly of sheets 12, 13 and 14 to become a color filter. In some instances, sheet 14 may have such characteristics, for example, due to its molecular arrangement and stress provided during manufacture that, in conjunction with sheets 12 and 13, it is a color filter, for instance, for transmission of red, when not under tension in the apparatus. In such case, application of a fixed degree of tension will deform it to cause it to become transmissive of green, while a different, e. g., stronger tension will make it transmissive of blue. In other cases, its color transmissions may be established by three different tensions, all in the same direction.

The magnet 23 may be energized to place the sheet 14 under one or more desired degrees of tension by the current impulses applied to magnet 23. By having these impulses suitably synchronized with the field signals acting also on cathode ray tube 10 in producing successive partial images in black and white, the elements 12, 13 and 14 will serve as three successive color filters, and the image visible from the right of Figure 1 will appear in natural colors when viewed in incident white light.

Instead of being perpendicular to each other, the directions of polarization of the polarizers 12 and 13 may be parallel. Also, in this case sheets 12, 13 and 14, when sheet 14 is placed under a certain degree of tension, will only be transmissive of a band of light of substantially one color. Other degrees of tension will render them transmissive of other colors. By successively applying such tensions, natural color images will be produced.

Figure 3:
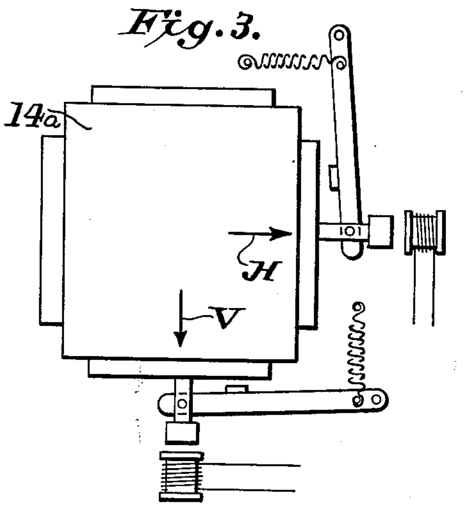
Figure 3 is a diagrammatic view of a modification and showing a birefringent element in front elevation.

Figure 3 diagrammatically illustrates a modification whereby a sheet of birefringent material 14a is deformed by being placed under tensions exerted along lines H and V which are, for example, at 90° to each other. With such an arrangement, and with the polarizers crossed, sheet 14a in combination with sheets 12 and 13 may be transmissive of one color in its normal state, and made transmissive of two other colors when stretched along H or V, respectively. Alternatively, the combination of sheets 12, 13 and 14 may be made transmissive of different colors by applying different tensions to sheet 14a along line H, for example. In any event, the tension applying means will be suitably synchronized with the partial image produced on the picture screen such as 11 of Figure 1 to produce images in natural color.

Figures 4, 5:
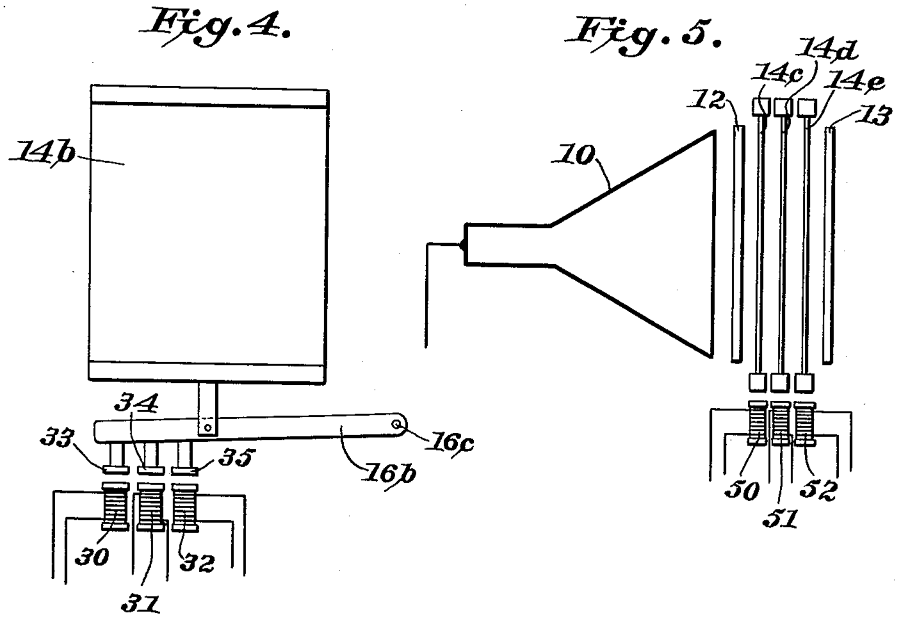
Figure 4 is a view similar to Figure 2 and showing a further modification.
Figure 5 is a side elevation of a further modification.

Figure 4 shows a modification whereby several degrees of tension may be exerted on a birefringent sheet 14b by means of three magnets 30, 31 and 32 individually acting upon armatures 33, 34 and 35, respectively. The armatures are secured to a bar 15b secured to one edge of sheet 14b and pivoted at 16c. The armatures may be placed at such positions on bar 15b and the magnets 30, 31 and 32 may have such characteristics, for instance, number of windings, that the same current successively applied to each one, for instance, by electronic switching means well-known per se and controlled by the field synchronizing impulses, will exert different degrees of tension on sheet 14b and thereby produce images in natural color.

Figure 5 shows a further modification wherein three sheets of birefringent material are positioned between the two sheets 12 and 13 of polarizing material. The birefringent sheets, designated 14c, 14d and 14e, respectively, are positioned one behind the other and may be of the same material but of different thicknesses, or may be of different degrees of birefringence. In any event, each sheet would normally be free to birefringence. It will be observed that if the three sheets are successively placed under suitable tensions by synchronized current impulses to the respective magnets 50, 51 and 52, the screen image will appear in natural color.

Figure 6:
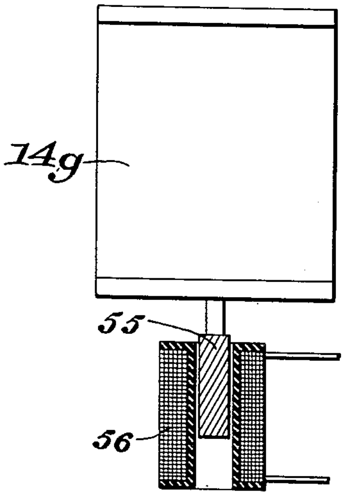
Figure 6 is a view similar to Figure 2 of another modification.

Figure 6 shows a modified arrangement for exerting varying tensions on a sheet of birefringent material. In this instance, an elongated ferromagnetic rod or tube 55 is secured to the lower edge of sheet 14g. Member 55 extends into a coil 56 and will be subjected to varying forces producing varying tensions in sheet 14 in proportion to the current flowing in that coil.

In connection with all of the above embodiments of the invention, it will be noted that with a birefringent sheet such as 14 having a thickness $d$, and one index of refraction $n_o$ and another index of refraction $n_e$, for the ordinary and extraordinary rays, respectively, and with the polarizers crossed, only light of wavelengths $$\lambda=\frac{2(ne-no)d}{n}$$

(with $n$=1, 3, 5, et cetera) is allowed to pass through sheets 12, 13 and 14. With small $n$ values it can be arranged that for slightly varying values $(n_e-n_o)$ the transmission band shifts through the whole visible spectrum, and three suitable $(n_e-n_o)$ values can be chosen so that the filter is blue, red or green, dependent upon that value.

If the polarizers are arranged with their axes parallel, $n$ would be 0, 2, 4, 6, et cetera.

It will be seen that it is advisable to make the sheet 14 of a material the birefringency of which changes markedly with changed tension, and further has a large dependency on the optical wavelength, i. e., a large dispersion of birefringency. Cellophane is an example of a material having these characteristics.

Figure 7:
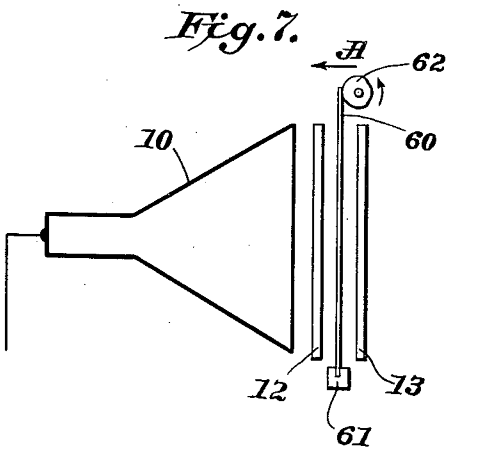
Figure 7 is a side elevation of an additional modification.

Throughout the foregoing, reference has been made to placing the birefringent sheet under a state of strain, or deforming it by stretching or expansion, i. e., straining it in the direction of the birefringent element. However, in some instances, as with certain stiff but elastic materials such as a thin sheet of glass, the deformation may be perpendicular to the sheet. Figure 7 shows a modification of the Figure 1 structure including a sheet 60 of thin glass positioned between polarizers 12 and 13. With the lower edge of sheet 60 held firmly as by the fixed clamp 61, sheet 60 can be successively bent or deflected to different degrees in the direction of the arrow A by means of a small cam 62 including three successive rises. Cam 62 can be rotated at high speed by a small motor, not shown, rotated in synchronism with the color field signals applied to the cathode ray tube.

Instead of using a rotary cam, the sheet 60 could be deflected by an electromagnet or coil as in Figure 6, acting upon an armature secured to the free edge of the sheet, and with the armature movable in the direction of the arrow A of Figure 7.

It will be understood from the foregoing that the present invention will be highly efficient in producing colored images and without any large rapidly moving operating elements. If magnets are used to place the sheets under tension, they may be extremely small and, in any event, can be operated indefinitely without wear and resultant noise. In addition, magnets can be operated at the relatively high speed necessary by small current flow controlled through electronic tubes and in synchronization with the partial pictures on the cathode ray tube screen. If a motor-driven rotary cam is used, these parts can be relatively small.

Although the invention has been primarily described in connection with a television cathode ray tube, it will be obvious that it may be used with other types of television apparatus as well as with motion picture projectors or, in fact, any situation where colored images are to be produced.

Any long period changes in birefringence may be easily compensated by slight alterations of the actuating currents at suitable controls, and with suitable test colors which may be occasionally transmitted and compared to colors in a color normal.

The terminology used in the specification is for the purpose of description, and not of limitation, the scope of the invention being indicated in the claim.

I claim:

In an apparatus for producing images in color, means including a viewing tube face to successively produce partial images in black and white representative of successive colors, a pair of light polarizing elements in front of said means with the respective axis of polarization thereof at right angles to each other, a birefringent element interposed between said polarizing elements, the polarizing elements and birefringent element being coextensive in area with the area of the viewing tube face mechanical means for applying forces to the birefringent element to place said birefringent element under tension in a first direction and then in a second direction at an angle to said first direction, means for controlling said mechanical means for applying the respective forces in synchronism with the production of partial color images by said first-named means, means whereby the forces are of such order in the respective directions that the images will be visible in differing colors.

References Cited in the file of this patent

UNITED STATES PATENTS

| Number | Name | Date |
|---|---|---|
| 2,010,307 | Leishman | Aug. 6, 1935 |
| 2,011,553 | Land | Aug. 13, 1935 |
| 2,014,688 | Mabboux | Sept. 17, 1935 |
| 2,070,787 | Frocht | Feb. 16, 1937 |
| 2,077,031 | Birch-Field | Apr. 13, 1937 |
| 2,109,540 | Leishman | Mar. 1, 1938 |
| 2,118,160 | Cawley | May 24, 1938 |
| 2,163,530 | Thieme | June 20, 1939 |
| 2,174,269 | Land | Sept. 26, 1939 |
| 2,255,933 | Land | Sept. 16, 1941 |
| 2,350,892 | Hewson | June 6, 1944 |
| 2,493,200 | Land | Jan. 3, 1950 |